(12) United States Patent
Godel et al.

(10) Patent No.: US 8,898,898 B2
(45) Date of Patent: Dec. 2, 2014

(54) METHOD AND DEVICE FOR PRODUCING A PISTON FRO AN INTERNAL COMBUSTION ENGINE AND PISTON FOR INTERNAL COMBUSTION ENGINE

(75) Inventors: Peter Godel, Freienried (DE); Marc-Manuel Matz, Friedberg (DE); Wolfram Cromme, Nuremberg (DE); Klaus Lades, Nuremberg (DE); Frank Dornenburg, Nuremberg (DE)

(73) Assignee: Federal-Mogul Nurnberg GmbH, Nuremberg (DE)

( * ) Notice: Subject to any disclaimer, the term of this patent is extended or adjusted under 35 U.S.C. 154(b) by 392 days.

(21) Appl. No.: 13/266,559

(22) PCT Filed: Mar. 9, 2010

(86) PCT No.: PCT/EP2010/052950
§ 371 (c)(1),
(2), (4) Date: Jan. 9, 2012

(87) PCT Pub. No.: WO2010/124894
PCT Pub. Date: Nov. 4, 2010

(65) Prior Publication Data
US 2012/0103298 A1    May 3, 2012

(30) Foreign Application Priority Data

Apr. 27, 2009    (DE) .......................... 10 2009 002 653

(51) Int. Cl.
*F02F 3/00*    (2006.01)
(52) U.S. Cl.
USPC ................................. 29/888.049; 123/193.6
(58) Field of Classification Search
USPC ............ 123/19.36, 41.35, 193.6; 29/888.049; 277/456
See application file for complete search history.

(56) References Cited

U.S. PATENT DOCUMENTS

| | | | |
|---|---|---|---|
| 2,978,284 A * | 4/1961 | Daub | 277/456 |
| 5,743,012 A | 4/1998 | Adams et al. | |
| 2002/0069528 A1 * | 6/2002 | Otte et al. | 29/888.049 |

FOREIGN PATENT DOCUMENTS

| | | |
|---|---|---|
| DE | 19649363 A1 | 6/1997 |
| DE | 19807176 A1 | 10/1999 |
| DE | 102004003980 A1 | 8/2005 |
| DE | 102005047035 B3 | 4/2007 |
| DE | 102006010190 A1 | 9/2007 |
| EP | 0937888 B1 | 6/2003 |

(Continued)

*Primary Examiner* — Marguerite McMahon
(74) *Attorney, Agent, or Firm* — Robert L. Stearns; Dickinson Wright, PLLC

(57) ABSTRACT

The invention relates to a method for producing a piston for an internal combustion engine, wherein a section which in the finished piston has a cooling duct (14) and a piston ring groove is recessed at first, the later cooling duct is then covered, and finally material for accommodating the piston ring is applied, and which is characterized in that the later cooling duct is covered by a wire material which is provided in a length, greater than necessary for one single piston. A device for producing a piston for an internal combustion engine with an at first recessed section that in the finished piston has a cooling duct (14) and a piston ring groove, has a device for attaching a cover on the cooling duct and a device for providing wire material having a length greater than necessary for one single piston. A piston for an internal combustion engine has a cooling duct (14) and a reinforcement material for accommodating a piston ring as well as a cover material between the cooling duct (14) and the reinforcement material, wherein the cover material is made of wire material continuously unwinding from a roll.

10 Claims, 2 Drawing Sheets

(56) References Cited

FOREIGN PATENT DOCUMENTS

| | | | |
|---|---|---|---|
| EP | 1536125 | A1 | 6/2005 |
| JP | 61-252855 | * | 5/1985 |
| JP | 03149002 | A | 6/1991 |
| JP | 2000213413 | | 8/2000 |
| JP | 2005120891 | A | 5/2005 |
| RU | 2167039 | C2 | 5/2001 |
| RU | 2318126 | C1 | 2/2008 |
| WO | WO 82/03814 | A1 | 11/1982 |

* cited by examiner

METHOD AND DEVICE FOR PRODUCING A PISTON FRO AN INTERNAL COMBUSTION ENGINE AND PISTON FOR INTERNAL COMBUSTION ENGINE

BACKGROUND OF THE INVENTION

1. Technical Field

The invention relates to a method and a device for producing a piston for an internal combustion engine and to a piston for an internal combustion engine.

When intended for diesel engines, almost one hundred percent of pistons for internal combustion engines are produced by means of gravity die casting. This also applies to a large proportion of pistons for Otto engines. Within the framework of the development of smaller and smaller, but at the same time more efficient engines, greater and greater compressive stresses occur. This means greater stressing of the first piston ring and the first ring groove of the piston in which the latter is accommodated. In particular, in the future highly stressed pistons for Otto engines will have to be provided with anti-wear reinforcement in order to improve the life span and the operating characteristics of the pistons and piston rings.

2. Related Art

In the field of Otto engine pistons previously used items are known wherein the highly stressed first ring groove is reinforced locally with an electrically applied aluminium oxide layer in order to withstand the high surface pressures and wear stresses in the first ring groove.

With diesel engine pistons it is already standard, and it could increasingly become a requirement for Otto engine pistons, to cast ring carriers integrally; from a technical point of view, however, this is very complex. In the domain in question it is known, furthermore, in particular for diesel engine pistons which normally have a cooling duct, to insert a ring carrier which is combined with a cooling duct manually into the die. Said ring carrier can be immersed into liquid aluminium before placing into the die using the so-called Alfin method, and so is totally wetted with partially solidified aluminium upon recasting. This means particularly good metallic bonding between the ring carrier and the surrounding piston material. The cooling duct can have a mould core, for example made of salt, which can be washed out after solidification of the piston blank.

A method is known from DE 198 07 176 C2 for producing a piston for an internal combustion engine according to the preamble to Claim 1 wherein the section of the uppermost ring groove and the cooling duct is at first recessed, and is then covered by a radially inwardly stretched covering ring so that the remaining groove, from which the ring groove is later cut, can subsequently be filled, for example by thermal injection.

According to DE 196 49 363 C2 the section in question is formed by a melting core the outer ring of which is later removed in order to fill this section with reinforcement material. Subsequently, the inner section of the melting core is also removed in order to form the cooling duct.

EP 1536 125 A1 describes a piston in which there is a recess in the upper part of the piston which is closed by a covering element in one or more parts in order to form a cooling duct.

A method emerges from DE 10 2004 003 980 A1 for producing a closed cooling duct of a piston made of forged steel wherein initially a radially outwardly facing circumferential opening is turned in and which is subsequently closed by two semi-circular elements.

WO 82/03814 A1 relates to a method for producing a piston, wherein the section of a piston ring groove is initially cut, and is subsequently processed with an electron or laser beam in order to form an alloy section. The piston ring groove is then cut out of the section treated in this way.

Finally, DE 10 2005 047 035 B3 describes a method for producing a piston for an internal combustion engine wherein only the cooling duct is filled with a removeable mass, and the outer radial groove, from which the first ring groove is later cut, is filled with reinforcement material. Next the removeable mass is removed so that a ring-shaped cooling duct remains.

SUMMARY OF THE INVENTION

An object forming the basis of the invention is to provide a method and a device for producing a piston for an internal combustion engine with which a piston of this type can be produced particularly efficiently, and moreover the requirements made of it are fulfilled. Furthermore, a corresponding piston should be produced.

Consequently, when producing a piston for an internal combustion engine a section, which in the finished piston comprises a cooling duct and a piston ring groove, is recessed at first, and the later cooling duct is then covered or closed. Material for accommodating the piston ring is applied to the "closure". The method according to the invention acquires its special efficiency in that in order to cover the cooling duct wire material is used which is provided in a length which is greater than the length required for a single piston. In other words, with regard to its dimensions, individually adapted rings or the like are not provided, but wire material can for example be continuously unwound from a roll and be introduced into the recess such that the cooling duct is covered, and upon reaching the required length the wire material can be cut. The preferred procedural steps mentioned above and many of those named below can be automated so that production of the piston according to the invention becomes particularly easy.

The section which, in the finished piston comprises a cooling duct and a piston ring groove, can already be recessed when casting or be pre-processed in an appropriate manner. Furthermore, few requirements are to be observed for the geometry both of the cooling duct and of the groove provided for the reinforcement material and the material serving as a ring carrier. In relation to a plane the cooling duct can be perpendicular to the piston axis and be symmetrical through the centre of the cover material, but it can also be located predominantly below the aforementioned plane, and its upper edge can be located on a level with the upper edge of the cover material. Furthermore, it is conceivable for the cooling duct in its section lying towards the piston axis, and so towards a possible combustion bowl, that its geometry is adapted to the shape of the combustion bowl. For example, material with a constant thickness along the piston axis can remain between the combustion bowl and the cooling duct.

In any case, by providing the wire material covering the cooling duct with a large length, and so preferably continuous "infinite" provision in relation to the length required for a single piston, a higher degree of automation can be achieved, and in particular previously required, manual working steps such as the pre-treatment and Alfin processing of ring carriers and the placing of the latter and of mould cores into the die and the washing out or removal from the moulds of the mould cores can be dispensed with.

Preferred further developments of the method according to the invention are described in the further claims.

As mentioned above, the method according to the invention can be implemented particularly efficiently by the wire material covering the cooling duct continuously being unwound from a roll.

For the application of the wire material such that the cooling duct is covered, form-fit application, for example by clamping, has proved to be particularly advantageous.

Furthermore, in connection with this, an initially chosen form of wire, which offers advantages, for example as a mass material, as regards material costs, can be deformed during the application in order to cover the cooling duct.

With regard to the shape of the wire cross-section one currently thinks of an elliptical, rectangular or trapezoidal cross-section because for such cross-sections one can expect advantages when attaching to the narrow point between the cooling duct and the outer, radial groove. However, any other wire geometries are conceivable.

For the in particular material bonded connection between the covering wire material and the piston material and/or the reinforcement material that is preferably applied to the covering wire material so as to subsequently cut out a ring groove, it proves to be advantageous to heat the wire material, preferably with local limits, and preferably inductively.

Particularly preferable in this case is heating just below the melting point of the wire material or the piston base material so as on the one hand to not complicate the production method by the necessary handling of molten material, and at the same time to satisfy the requirement metallurgically for a particularly good connection between the aforementioned materials.

As already indicated, within the framework of the method according to the invention a reinforcement material is applied to the covering wire material by means of an injection method.

In connection with this, particular advantages are offered when at least two different materials are applied at the same time or one after the other, which are preferably continuously provided as wires, and the mix ratio of which is set, for example, by different wire diameters and/or different feed rates.

In particular, particularly good properties are expected if an AlSi alloy and a non-alloy steel are combined as materials, and/or the mix ratio between two different materials is 60 to 70:30 to 40. The measures specified in the last two paragraphs are independent of the further features of this application and are advantageous, and so can not be combined.

The aforementioned object is furthermore achieved by a device for producing a piston for an internal combustion engine which has a device for providing wire material in a length which is greater than the length required to cover the cooling duct of a single piston. This can be, for example, a wire unwinding device.

In order to apply the wire material such that the cooling duct is covered, after initial considerations a knurling tool, for example, in the form of a roller that can additionally deform the applied wire, has proved to be particularly advantageous.

The further devices correspond substantially to those required in order to implement the aforementioned procedural steps. For the most extensive automation possible the devices for applying the wire material and for heating the latter and for thermally spraying reinforcement material can, for example, be combined in a single machine.

Finally, the aforementioned object is achieved by the piston which is characterised in that it has as a cover material between the cooling duct and the reinforcement material for accommodating the piston ring a wire material that is continuously unwound from a roll, is deformed upon application and/or is subsequently heated in the manner described above.

BRIEF DESCRIPTION OF THE DRAWINGS

In the following the invention is described in more detail by means of embodiments shown as examples in the drawings.

DETAILED DESCRIPTION OF PREFERRED EMBODIMENTS OF THE INVENTION

Figure 1:
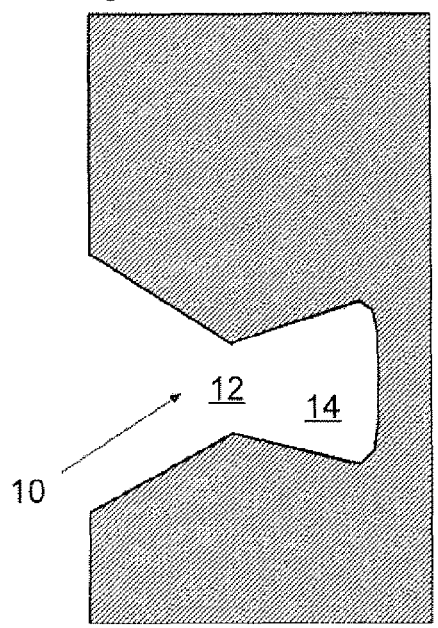
FIG. 1 a sectional view of an upper side section of a piston blank.

FIG. 1 shows as a section a region of a piston blank located close to the bottom of the piston (at the top in FIG. 1) and to an outer side of the piston. As described in greater detail below, the groove 10 shown, open to the outer side (on the left in FIG. 1) and trapezoidal in the exemplary embodiment shown, is filled with reinforcement material and then provided with a groove for accommodating an uppermost piston ring. Said groove 10 extends towards a narrow point 12 extending from which a further groove 14 widening towards the piston axis (on the right in FIG. 1) is provided which, in the example shown, is also trapezoidal. As described in greater detail below, this groove 14 is closed in the course of the process according to the invention, and in the finished piston forms a cooling duct. In the example shown both grooves 10, 14 are substantially symmetrical to a plane perpendicular to the piston axis and approximately through the centre of the narrow point 12. However, in the following alternative embodiments are described in which this is not the case.

Figure 2:
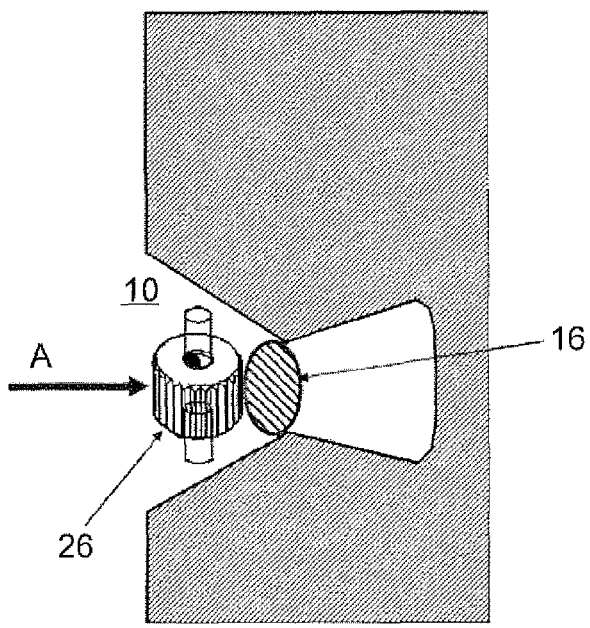
FIG. 2 the section of FIG. 1 with an inserted wire material and a tool.
Figure 8:
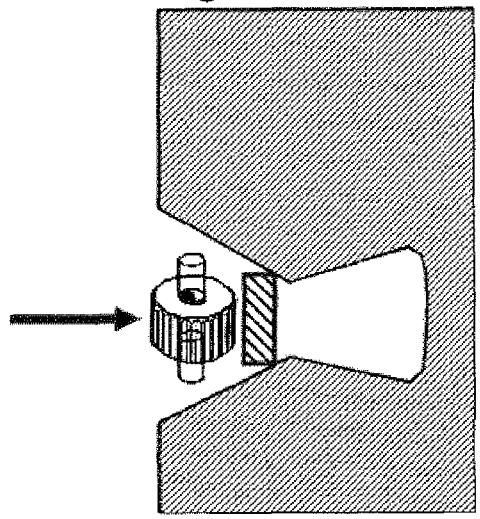
FIGS. 8 and 9 the situation of FIG. 2 with alternative wire geometries.
Figure 9:
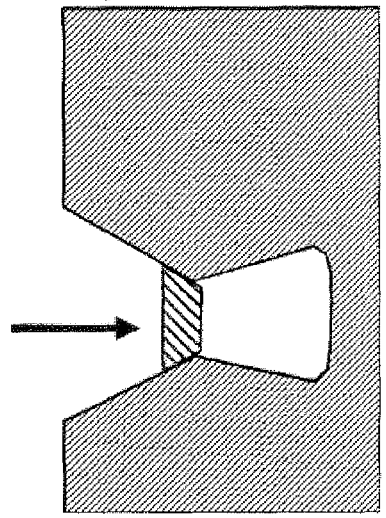

As shown in FIG. 2, within the framework of the method according to the invention wire material 16 is introduced into the groove 10 such that it is attached at the narrow point 12, for example with form-fit. In the example of FIG. 2 the wire material 16 has a substantially elliptical cross-section, the longer main axis being somewhat larger than the dimensions of the narrow point 12 so that the attachment described is made possible. This can be implemented in particular by pressing on in the direction of the arrow A and, for example, using an appropriate knurling tool 26. In the example shown the knurling tool 26 is substantially cylindrical, and has a fluted outer surface which can be slightly concave in form. Likewise, the knurling tool 26 can be largely cylindrical or outwardly convex, in other words, round in form. Alternatively, the knurling tool 26 could be in the form of a truncated cone. As shown by FIGS. 8 and 9, a largely rectangular cross-section or a trapezoidal cross-section, wherein the wider side points outwards, can be used as further wire geometries.

Figure 3:
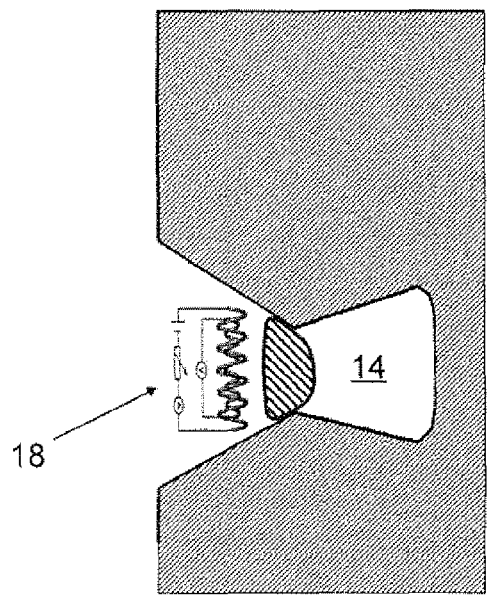
FIG. 3 the section of FIG. 2 with deformed wire material and a heating device.

As emerges from FIG. 3, the wire material provided in order to cover the cooling duct groove 14 can be somewhat flattened by pressing onto its outer side. In FIG. 3 it is additionally shown that the wire can be heated by a heating device 18, which can, for example, be designed to be inductive.

Figure 4:
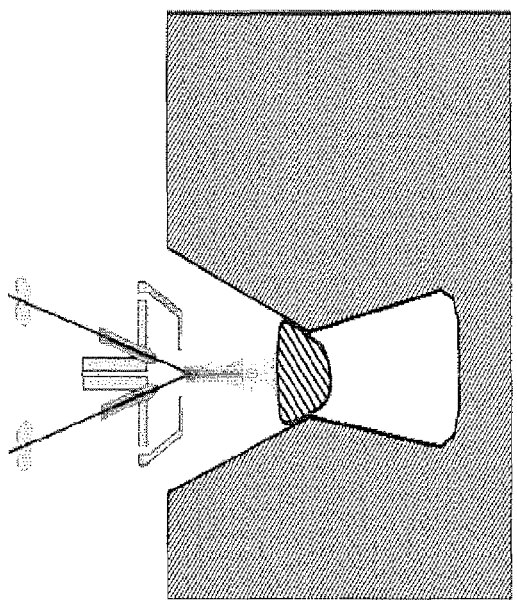
FIG. 4 the section of FIG. 3 upon application of reinforcement material.
Figure 5:
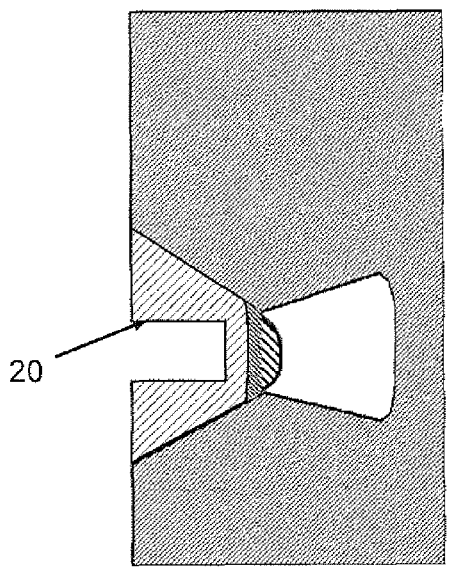
FIG. 5 the section of FIGS. 1 to 4 in the finished state.

As shown in FIG. 4, reinforcement material can subsequently be applied to the wire material 16, for example by thermal injection, so as in this section to satisfy the requirements for an uppermost piston ring to be able to be accommodated permanently and reliably. For this purpose, as shown as a result in FIG. 5, the outer groove is preferably totally filled with reinforcement material and then finished on the cylindrical outer surface of the piston such that it is largely flush with the latter. Furthermore, a piston ring groove 20 is cut.

Figure 6:
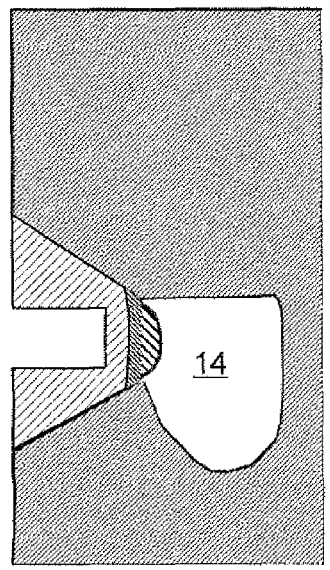
FIG. 6 the section of FIG. 5 in a different embodiment.

There emerges from FIG. 6 an alternative geometry of the groove 14 for the cooling duct in which the latter extends from the upper edge of the narrow point 12, i.e. from the upper edge of the wire material 16 to the bottom in the finished piston, and in the embodiment shown in particular reaches out over the lower edge of the outer groove 10. In the example shown the cooling duct groove 14 is largely level on its upper side and curved on its lower side.

Figure 7:
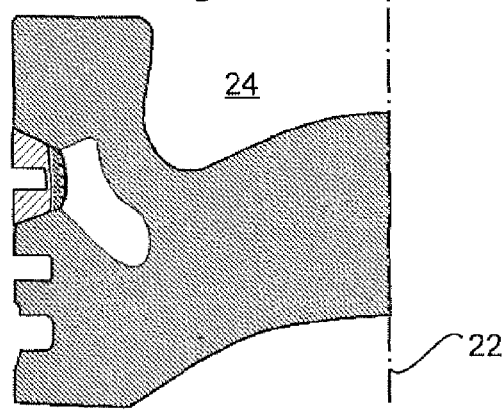
FIG. 7 the section of FIG. 5 in a different embodiment.

FIG. 7 shows a further alternative embodiment of the cooling duct groove 14 which is similar in appearance in the section above the centre point of the narrow point 12 to the embodiment of FIGS. 1 to 5, but in its lower section extends downwards at an angle and in the direction of the piston axis 22 so that it adapts to the geometry of a combustion bowl 24. In particular, the section of the cooling duct groove 14 directed towards the piston axis 22 is formed, for example bent, such that there remains between the cooling duct groove 14 and the combustion bowl 24 a "bridge" with largely consistent thickness, and/or the section of the cooling duct closest to the piston axis is approximately the same or a smaller distance away from the piston axis 22 as/than the point of the combustion bowl lying furthest away from the combustion bowl.

The invention claimed is:

1. A method for producing a piston for an internal combustion engine wherein a section, which in the finished piston comprises a cooling duct and a piston ring groove, is recessed at first, the later cooling duct is then covered, and finally a reinforcement material for accommodating the piston ring is applied, the later cooling duct is covered by wire material which is provided in a length which is greater than the length required for a single piston, and wherein after covering the later cooling duct, the reinforcement material is applied to the wire material by means of an injection method.

2. The method according to claim 1, wherein the wire material is continuously unwound from a roll.

3. The method according to claim 1 wherein, the wire material is applied with form-fit.

4. The method according to claim 1, wherein the wire material is deformed during or after application.

5. The method according to claim 1, wherein the wire material has a largely elliptical, rectangular or trapezoidal cross-section.

6. The method according to claim 1, wherein after application, the wire material is inductively heated with local limits.

7. The method according to claim 6, wherein the wire material is heated just below the melting point of the wire material or of the piston material.

8. The method according to claim 1, wherein within the framework of the injection method at least two different materials are applied at the same time or one after the other, preferably provided as wires, and the mix ratio of the two materials is set by different wire diameters and/or feed rates.

9. The method according to claim 8, wherein an AlSi alloy and a non-alloy steel are used as materials, and/or the mix ratio is 60 to 70:30 to 40.

10. A piston for an internal combustion engine comprising a cooling duct and a reinforcement material for accommodating a piston ring and comprising a cover material between the cooling duct and the reinforcement material, the cover material consisting of wire material unwound continuously from a roll and wherein the reinforcement material is joined with the cover material through an injection process.

* * * * *